(12) United States Patent
Inda

(10) Patent No.: US 8,883,355 B2
(45) Date of Patent: Nov. 11, 2014

(54) BATTERY INCLUDING LITHIUM ION CONDUCTIVE SOLID ELECTROLYTE AND METHOD FOR PRODUCING THE SAME

(75) Inventor: Yasushi Inda, Sagamihara (JP)

(73) Assignee: Ohara, Inc., Kanagawa (JP)

( * ) Notice: Subject to any disclaimer, the term of this patent is extended or adjusted under 35 U.S.C. 154(b) by 467 days.

(21) Appl. No.: 12/383,047

(22) Filed: Mar. 19, 2009

(65) Prior Publication Data

US 2009/0239153 A1 Sep. 24, 2009

(30) Foreign Application Priority Data

Mar. 19, 2008 (JP) ................................. 2008-071178

(51) Int. Cl.
| | | |
|---|---|---|
| *H01M 10/056* | (2010.01) | |
| *C03C 10/00* | (2006.01) | |
| *C03C 4/18* | (2006.01) | |
| *H01M 10/0525* | (2010.01) | |
| *H01M 10/0562* | (2010.01) | |

(52) U.S. Cl.
CPC ............... *C03C 10/0009* (2013.01); *C03C 4/18* (2013.01); *C03C 10/0027* (2013.01); *H01M 10/0525* (2013.01); *H01M 10/0562* (2013.01); *H01M 2300/0071* (2013.01); *Y02E 60/122* (2013.01)
USPC ........... 429/305; 429/320; 429/322; 29/623.1

(58) Field of Classification Search
USPC .......................... 429/305, 320, 322; 29/623.1
See application file for complete search history.

(56) References Cited

U.S. PATENT DOCUMENTS

| | | | |
|---|---|---|---|
| 6,030,909 | A | 2/2000 | Fu |
| 6,845,622 | B2 | 1/2005 | Sauciuc et al. |
| 2003/0205467 | A1 | 11/2003 | Fu |
| 2007/0048619 | A1* | 3/2007 | Inda .............................. 429/322 |

FOREIGN PATENT DOCUMENTS

| | | |
|---|---|---|
| EP | 0838441 | 4/1998 |
| EP | 1088796 | 4/2001 |
| EP | 1760819 | 3/2007 |
| JP | 11-157872 | 6/1999 |
| JP | 2000-034134 | 2/2000 |

* cited by examiner

*Primary Examiner* — Ula C. Ruddock
*Assistant Examiner* — Frank Chernow
(74) *Attorney, Agent, or Firm* — Rankin, Hill & Clark LLP

(57) ABSTRACT

A lithium ion conductive glass ceramics which solves a problem of low thermal stability of the related-art lithium ion conductive glass ceramics and which is high in lithium ion conductivity, high in thermal stability of a raw glass and easy for molding is provided. The amount of a specified component in a glass ceramics (raw glass) is limited to a specified range, and specifically, a $ZrO_2$ component is incorporated in the range of from 0.5% to 2.5% in terms of % by mass on the oxide basis.

9 Claims, 1 Drawing Sheet $Li_{1+x+z}Al_x(Ge_{1-Y}Ti_Y)_{2-x}P_{3-z}Si_zO_{12}$ CRYSTALLINE PHASE

EXAMPLE 1 AFTER CRYSTALLIZATION $2\theta$ (°)

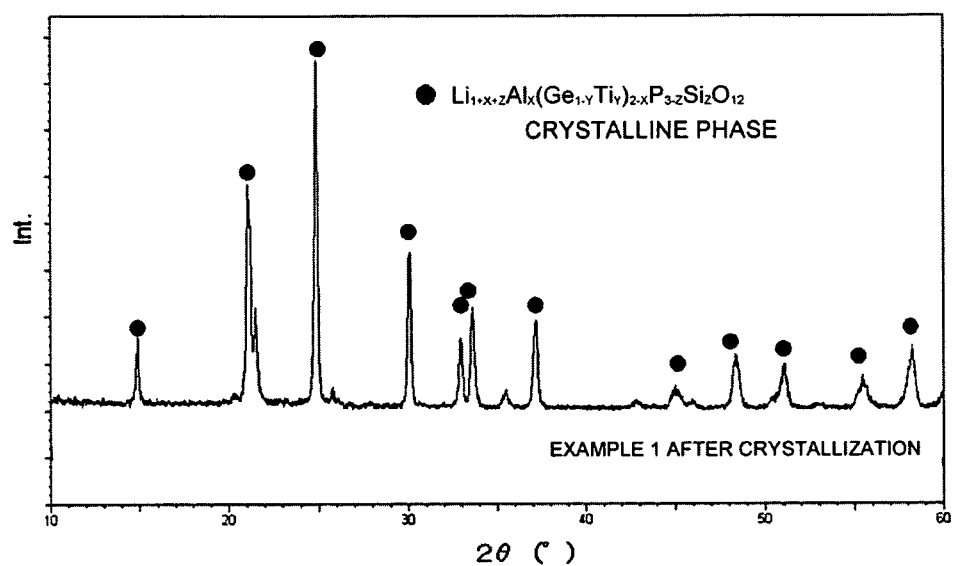

BATTERY INCLUDING LITHIUM ION CONDUCTIVE SOLID ELECTROLYTE AND METHOD FOR PRODUCING THE SAME

CROSS REFERENCES TO RELATED APPLICATIONS

The present application claims priority under 35 U.S.C. §119 from Japanese Patent Application No. 2008-071178 filed with the Japan Patent Office on Mar. 19, 2008, the entire contents of which are incorporated herein by reference.

BACKGROUND OF THE INVENTION

1. Field of the Invention

The present invention relates to a lithium ion conductive glass ceramics which is high in ionic conductivity, thermally and chemically stable and easy for the production.

2. Description of the Related Art

The progress of electronics in the recent years is conspicuous, and downsizing, weight reduction and high performance of electronic appliances are being rapidly advanced. Then, the development of a battery with high energy density and long life is eagerly desired as a power source for such an appliance. Above of all, expectation for a lithium ion battery is getting large every day.

Lithium ion conductive glass ceramics disclosed in JP-A-11-157872 and JP-A-2000-34134 are known as an electrolyte material of a lithium ion battery. The lithium ion conductive glass ceramics are obtained by depositing a crystalline in the interior of a glass by the heat treatment of a raw glass having a specified composition; and therefore, pores do not substantially exist in the interior so that the ionic conduction are not hindered by the pores. Accordingly, the lithium ion conductive glass ceramics have a characteristic feature that they are excellent in ionic conductivity as compared with lithium ion conductive oxide ceramics. However, the glass ceramics disclosed in JP-A-11-157872 involves a problem that its raw glass is low in thermal stability; and although it has high lithium ion conductivity, it was difficult to increase the thermal stability of the raw glass. When the thermal stability of the raw glass is low, there is caused a problem that in casting a molten glass in a die and performing molding, breakage is easily generated in the glass, and hence, the thermal control at the time of glass molding must be strictly carried out, leading to an increase of the production costs. When the thermal stability is low, there is also caused a problem that devitrification is easy to occur at the time of glass molding. The devitrification which is caused at the time of glass molding renders it difficult to uniformly deposit a desired crystalline in a sequent heat treatment (crystallization), resulting in making it unable to obtain high lithium ion conductivity. In order to generate neither breakage nor devitrification at the time of glass molding, it was necessary to strictly control a thermal condition at the time of molding a raw glass and also to strictly control an outflow velocity, an outflow condition and so on of a molten glass such that an impact is not given to the molten glass at the time of glass molding as far as possible.

Also, in JP-A-2000-34134, for the purpose of enhancing the thermal stability of a glass, it is successfully made to largely enhance (Tx−Tg) which is employed for evaluating the thermal stability of a glass by the addition of an $M'_2O_3$ component (wherein M' is one or two or more members selected among In, Fe, Cr, Sc, Y, La, Ce, Pr, Nd, Sm, Eu, Gd, Tb, Dy, Ho, Er, Tm, Yb and Lu). However, the thermal stability has not been achieved yet to extent that the glass can be mass-produced at low costs on an industrial scale. Also, raw materials having the foregoing M' component are high in a distribution price on the market, and it is not preferred to obtain the foregoing thermal stability by such a component.

SUMMARY OF THE INVENTION

In view of the foregoing problems, an object of the invention is to provide a lithium ion conductive glass ceramics which is high in lithium ion conductivity, high in thermal stability of a raw glass and easy for molding.

In view of the foregoing problems, the present inventor made extensive and intensive investigations. As a result, it has been found that by limiting the amount of a specified component in a glass ceramics (raw glass) to a specified range, the thermal stability of the raw glass becomes high, whereby a lithium ion conductive glass ceramics with high lithium ion conductivity is obtained, leading to accomplishment of the invention. Specific constitutions of the invention are as follows.

(1) A lithium ion conductive glass ceramics comprising from 0.5% to 2.5% of a $ZrO_2$ component in terms of 9 by mass on the oxide basis.

(2) The lithium ion conductive glass ceramics as set forth above in (1), which, when a crystallization starting temperature of a raw glass is defined as Tx (° C.), and a glass transition point of the raw glass is defined as Tg (° C.), has a value of (Tx−Tg) of 70° C. or more and not more than 160° C.

(3) The lithium ion conductive glass ceramics as set forth above in (1) or (2), which contains a crystalline phase of $Li_{1+x+z}M_x(Ge_{1-y}Ti_y)_{2-x}P_{3-z}Si_zO_{12}$, wherein $0<x\le0.6$, $0.2\le y<0.8$, $0\le z\le0.5$, and M is one or two members selected from Al and Ga.

(4) The lithium ion conductive glass ceramics as set forth above in any one of (1) to (3), which contains respective components of from 3.5% to 5.0% of $Li_2O$, from 50% to 55% of $P_2O_5$, from 10% to 30% of $GeO_2$, from 8% to 22% of $TiO_2$ and from 5% to 12% of $M_2O_3$, wherein M is one or two members selected from Al and Ga, in terms of % by mass on the oxide basis.

(5) The lithium ion conductive glass ceramics as set forth above in any one of (1) to (4), which contains a component of from 0% to 2.5% of $SiO_2$ in terms of % by mass on the oxide basis.

(6) The lithium ion conductive glass ceramics as set forth above in any one of (1) to (5), which has a lithium ion conductivity of $5.0\times10^{-5}$ S·cm$^{-1}$ or more at 25° C.

(7) A solid electrolyte for lithium battery comprising using the lithium ion conductive glass ceramics as set forth above in any one of (1) to (6).

(8) The solid electrolyte for lithium battery as set forth above in (7), which has a thickness of from 0.5 μm to 1,000 μm.

(9) A battery using the solid electrolyte for lithium battery as set forth above in (7) or (8).

(10) A method for producing a glass ceramics comprising:
a step of melting a raw glass containing respective components of from 3.5% to 5.0% of $Li_2O$, from 50% to 55% of $P_2O_5$, from 10% to 30% of $GeO_2$, from 8% to 22% of $TiO_2$, from 0.5% to 2.5% of $ZrO_2$ and from 5% to 12% of $M_2O_3$, wherein M is one or two members selected from Al and Ga, in terms of % by mass on the oxide basis;
a step of molding the molten raw glass; and
a crystallization step of heat treating the molded raw glass to deposit a crystalline phase of $Li_{1+x+z}M_x(Ge_{1-y}Ti_y)_{2-x}P_{3-z}Si_zO_{12}$, wherein $0<x\le0.6$, $0.2\le y<0.8$, $0\le z\le0.5$, and M is one or two members selected from Al and Ga.

(11) The method for producing a glass ceramics as set forth above in (10), wherein the raw glass contains a component of from 0% to 2.5% of $SiO_2$ in terms of % by mass on the oxide basis.

(12) A method for producing a solid electrolyte for lithium battery comprising a step of grinding the glass ceramics obtained in any one of (10) and (11) and a step of polishing it.

According to the invention, since the thermal stability of the raw glass is tremendously enhanced, even in the case of casting a molten glass of the raw glass in a die, it is possible to stably mold the raw glass under a wide temperature condition. Also, since an impact which is given to the molten glass is tolerated to some extent, it is not necessary to strictly control an outflow velocity, an outflow condition and so on of the molten glass. Then, a high value can be obtained as the lithium ion conductivity of the glass ceramics obtained by the sequent heat treatment (crystallization).

BRIEF DESCRIPTION OF THE DRAWING

FIG. 1 is a graph showing a powder X-ray diffraction pattern of Example 1.

DESCRIPTION OF THE PREFERRED EMBODIMENTS

The invention is hereunder described in detail. The composition of the glass ceramics of the invention can be expressed in terms of % by mass on the oxide basis. The terms "oxide basis" as referred to herein are concerned with a method of expressing the composition of each of components to be incorporated in a crystallized glass of the invention on the assumption that oxides, nitrates and so on which are used as raw materials of constitutional components of the crystallized glass of the invention are all decomposed at the time of melting and converted into oxides; and the terms "% by mass on the oxide basis" as referred to herein express the amount of each of the components to be incorporated in the crystallized glass while defining the total sum of the mass of this formed oxide as 100% by mass.

Also, the composition of the glass ceramics expressed on the foregoing oxide basis is the same as the component of its raw glass.

The reasons why the composition of the glass ceramics is limited to the foregoing range are hereunder described. In this specification, the composition of the glass ceramics is expressed in terms of % by mass on the oxide basis unless otherwise indicated.

The present inventor has found that by especially limiting the range of the $ZrO_2$ component to from 0.5% to 2.5%, not only the stability of the raw glass can be tremendously enhanced, but high lithium ion conductivity can be obtained. When the content of the $ZrO_2$ component is less than 0.5%, since nucleus generation of the crystallization decrease, the crystallization temperature necessary for obtaining high ionic conductivity becomes high. By raising the crystallization temperature, the ionic conductivity can be increased. However, at the same time, the crystalline growth is excessively advanced, leading to the generation of a crack or an internal pore. When the content of the $ZrO_2$ component exceeds 2.5%, the glass is hardly melted, and a higher melt temperature is necessary. Also, since the devitrification properties are high, and the vitrification is hardly achieved, the stable glass production cannot be effected. In view of necessity for attaining minuteness and high ionic conductivity, a lower limit of the content of the $ZrO_2$ component is more preferably 0.7%, and most preferably 0.9%. Also, in view of high devitrification properties, an upper limit value of the content of the $ZrO_2$ component is more preferably 2.1% and most preferably 2%.

In general, the thermal stability of a glass is evaluated in terms of a value of (Tx−Tg) which is a difference between Tx (° C.) (crystallization temperature of the glass) and Tg (° C.) (transition temperature of the glass). The larger this value, the better the thermal stability of the glass. According to the foregoing constitution, in the glass ceramics of the invention, the thermal stability of the raw glass is largely enhanced; and the value of (Tx−Tg) is 70° C. or more. Though the lithium ion conductivity is slightly interior, the value of (Tx−Tg) can be a value of 160° C. at maximum. Taking into account the lithium ion conductivity and so on, the value of (Tx−Tg) can be a value of 72° C. or more in a more synthetically preferred embodiment and can be a value of 74° C. or more in the most preferred embodiment.

It is preferable that the glass ceramics of the invention has a crystalline phase of $Li_{1+x+z}M_x(Ge_{1-y}Ti_y)_{2-x}P_{3-z}Si_zO_{12}$, wherein $0<x\leq 0.6$, $0.2\leq y<0.8$, $0<z<0.5$, and M is one or two members selected from Al and Ga. When the glass ceramics contains this crystalline phase, high lithium ion conductivity is easily obtained.

The $Li_2O$ component is a component which is capable of providing an $Li^+$ ion carrier and useful for bringing lithium ion conductivity. In order to obtain satisfactory lithium ion conductivity, a lower limit of the content of the $Li_2O$ component is preferably 3.5% or more, more preferably 3.7% or more, and most preferably 3.9% or more. Also, in view of the matter that the devitrification properties become high, an upper limit of the content of the $Li_2O$ component is not more than 5.0%, more preferably not more than 4.8%, and most preferably not more than 4.6%.

The $P_2O_5$ component is a useful component for forming a glass and is also a constitutional component of the foregoing crystalline phase. When the content of this component is less than 50%, the melt temperature of the glass is high so that the vitrification hardly occurs. When the vitrification hardly occurs, hot molding of a glass is hardly achieved, and in particular, it is likely difficult to obtain a glass in a bulk shape (for example, 200 cm³ or more). For that reason, a lower limit value of the content of the $P_2O_5$ component is preferably 50% or more, more preferably 50.5% or more, and most preferably 51% or more. Also, when the content of the $P_2O_5$ component exceeds 55%, the foregoing crystalline phase is hardly deposited from the glass in the heat treatment (crystallization), and the desired properties are hardly obtained. Therefore, an upper limit value of the content of the $P_2O_5$ component is preferably not more than 55%, more preferably not more than 54.5%, and most preferably not more than 54%.

Also, when the content of the $ZrO_2$ component is low relative to the content of the $P_2O_5$ component which is a glass former, the nucleus formation does not satisfactorily occur at the time of crystallization, thereby forming a crystalline which is not fine but large, and the ionic conductivity and the minuteness become low. For that reason, a $P_2O_5/ZrO_2$ value which is a mass % ratio of the $P_2O_5$ component to the $ZrO_2$ component is preferably 25 or more, more preferably 30 or more, and most preferably 35 or more.

When the content of the $ZrO_2$ component is too large relative to the content of the $P_2O_5$ component, not only the melting point of the glass increases, but the devitrification is easy to occur at the time of glass molding. For that reason, the $P_2O_5/ZrO_2$ value which is a mass % ratio of the $P_2O_5$ component to the $ZrO_2$ component is preferably not more than 100, more preferably not more than 90, and most preferably not more than 75.

The GeO$_2$ component is a useful component for forming a glass and is also a component which can be a constitutional component of the lithium ion conductive crystalline phase. When the content of this component is less than 10%, the vitrification hardly occurs, the foregoing crystalline phase is hardly deposited, and high lithium ion conductivity is hardly obtained. Therefore, a lower limit value of the content of the GeO$_2$ component is preferably 10% or more, more preferably 11% or more, and most preferably 11.5% or more. Also, when the content of the GeO$_2$ component exceeds 30%, the ionic conductivity and the durability become low. Therefore, an upper limit value of the content of the GeO$_2$ component is preferably not more than 30%, more preferably not more than 28%, and most preferably not more than 26%.

The TiO$_2$ component is a useful component for forming a glass and is also a component which can be a constitutional component of the lithium ion conductive crystalline phase. When the content of this component is less than 8%, the vitrification hardly occurs, the foregoing crystalline phase is hardly deposited, and high lithium ion conductivity is hardly obtained. Therefore, a lower limit value of the content of the TiO$_2$ component is preferably 8% or more, more preferably 9% or more, and most preferably 10% or more. Also, when the content of the TiO$_2$ component exceeds 22%, the devitrification properties become high. Therefore, an upper limit value of the content of the TiO$_2$ component is preferably not more 22%, more preferably not more than 21%, and most preferably not more than 20%.

The M$_2$O$_3$ component (wherein M is one or two members selected from Al and Ga) is able to enhance the thermal stability of the raw glass and at the same time, brings an effect for enhancing the lithium ion conductivity upon solid dissolution of an Al$^{3+}$ and/or Ga$^{3+}$ ion into the foregoing crystalline phase. Therefore, a lower limit value of the content of the M$_2$O$_3$ component is preferably 5% or more, more preferably 6% or more, and most preferably 7% or more. However, when the content of the M$_2$O$_3$ component exceeds 12%, the thermal stability of a glass is rather deteriorated, and the conductivity of the glass ceramics is lowered, too. Therefore, an upper limit value of the content of the M$_2$O$_3$ component is preferably not more than 12%, more preferably not more than 11%, and most preferably not more than 10%.

The SiO$_2$ component is able to enhance the melt properties and thermal stability of the raw glass and at the same time, contributes to an enhancement of the lithium ion conductivity upon solid dissolution of an Si$^{4+}$ ion into the foregoing crystalline phase. Therefore, the SiO$_2$ component can be arbitrarily incorporated. However, when the content of the SiO$_2$ component exceeds 2.5%, a crack is easily formed at the time of crystallization, whereby the lithium ion conductivity is lowered. For that reason, in order to satisfactorily maintain the lithium ion conductivity, the content of the SiO$_2$ component is preferably not more than 2.5%, more preferably not more than 2.2%, and most preferably not more than 2%.

The M'$_2$O$_3$ component (wherein M' is one or two or more members selected among In, Fe, Cr, Sc, Y, La, Ce, Pr, Nd, Sm, Eu, Gd, Tb, Dy, Ho, Er, Tm, Yb and Lu) is effective for enhancing the melt properties and thermal stability of a glass, and therefore, it can be incorporated in an amount of up to 5% in total. Since such a component is very expensive with respect to the price of raw materials distributed in the market, it is preferable that such a component is not substantially incorporated.

Also, for the purpose of more enhancing the melt properties of the glass, it is possible to add B$_2$O$_3$, As$_2$O$_3$, Sb$_2$O$_3$, Ta$_2$O$_5$, CdO, PbO, MgO, CaO, SrO, BaO, ZnO, etc. The amount of such a material should be limited to not more than 3%. When such a material is added in an amount exceeding 3%, the conductivity is remarkably lowered following the addition amount thereof.

The lithium ion conductive glass ceramics of the invention can be produced by the following method. That is, prescribed amounts of respective starting raw materials are weighed and uniformly mixed; and the mixture is then charged in a platinum pot and heated for melting in an electric furnace. The temperature is raised to 1,200 to 1,400° C., and the mixture is melted while keeping this temperature for 2 hours or more. Thereafter, the molten glass is cast on an iron plate to prepare a plate-shaped glass. The thus obtained glass is heat treated (crystallized) at from 600 to 1,000° C. for from 1 to 24 hours.

According to the foregoing steps, a glass ceramics with high lithium ion conductivity, which is composed of, as a main crystalline phase, Li$_{1+x+z}$M$_x$(Ge$_{1-y}$Ti$_y$)$_{2-x}$P$_{3-z}$Si$_z$O$_{12}$ (wherein, 0<x≤0.6, 0.2≤y<0.8, 0≤z≤0.5, and M is Al and/or Ga), is obtained.

By using the following steps, substantially the same results are obtainable, too. That is, prescribed amounts of respective starting raw materials are weighed and uniformly mixed; and the mixture is then charged in a platinum crucible and heated for melting in an electric furnace. The temperature is raised to 1,200 to 1,400° C., and the mixture is melted while keeping this temperature for 2 hours or more. Thereafter, this melt is cooled with water to prepare a glass. The thus obtained glass is milled by a ball mill and then passed through a sieve to obtain a glass powder. Furthermore, the glass powder is press molded, put in an electric furnace and heated at from 800 to 1,000° C., thereby obtaining a glass ceramics with high lithium ion conductivity, which is composed of, as a main crystalline phase, the foregoing crystalline phase.

A value of the lithium ion conductivity of the lithium ion conductive glass ceramics of the invention, which can be obtained, is preferably 5.0×10$^{-5}$ S·cm$^{-1}$ or more, more preferably 8.0×10$^{-5}$ S·cm$^{-1}$ or more, and most preferably 1.0×10$^{-4}$ S·cm$^{-1}$ or more.

Also, in order to use the glass ceramics obtained in the foregoing method as a solid electrolyte for lithium battery such as a lithium ion secondary battery and a lithium primary battery, it may be processed according to the size of a battery to be prepared. For example, the glass ceramics may be processed in a thin-plate form as the shape, and known grinding methods and polishing methods which are usually adopted in glasses or glass ceramics may be adopted.

In the case where the glass ceramics is used as a solid electrolyte for lithium battery, in order to obtain mechanical strengths necessary for battery applications, a lower limit value of its thickness is preferably 0.5 μm or more, more preferably 1 μm or more, and most preferably 5 μm or more. Also, for the purpose of making the lithium ion conductivity satisfactory, an upper limit value of the thickness is preferably not more than 1,000 μm, more preferably not more than 500 μm, and most preferably not more than 300 μm.

By disposing a positive electrode material and a negative electrode material on the both sides of the foregoing solid electrolyte for lithium battery, further disposing a known collector and performing packaging by a known method, it is possible to obtain a lithium primary battery or a lithium ion secondary battery.

For the positive electrode material of the lithium primary battery of the invention, it is possible to use a transition metal compound or a carbon material capable of intercalating lithium therein. For example, a transition metal oxide containing at least one member selected among manganese, cobalt, nickel, vanadium, niobium, molybdenum and titanium, graphite, carbon and the like are useful.

Also, for the negative electrode material of this lithium primary battery, metallic lithium, an alloy capable of deintercalating lithium therefrom, for example, a lithium-aluminum alloy, a lithium-indium alloy, etc. and the like are useful.

As an active material to be used for the positive electrode material of the lithium ion secondary battery of the invention, a transition metal compound capable of intercalating therein and deintercalating therefrom lithium can be used. For example, a transition metal oxide containing at least one member selected among manganese, cobalt, nickel, vanadium, niobium, molybdenum and titanium and the like are useful.

Also, in this lithium ion secondary battery, as an active material to be used for its negative electrode material, it is preferred to use metallic lithium, an alloy capable of intercalating therein and deintercalating therefrom lithium, for example, a lithium-aluminum alloy, a lithium-indium alloy, etc., a transition metal oxide of titanium, vanadium, etc. and a carbon based material, for example, graphite, etc.

It is more preferred to add the same materials as those in the glass ceramics to be incorporated in the solid electrolyte to the positive electrode and the negative electrode because ionic conduction is imparted. When these are identical, since the migration mechanism of the ion to be contained in the electrolyte and the electrode materials is unified, the ionic migration between the electrolyte and the electrode can be smoothly achieved, and a battery with higher output and higher capacity can be provided.

Also, the solid electrolyte of the invention can be suitably used as an electrolyte of a lithium-air battery. For example, a lithium-air battery can be used by using lithium metal as a negative electrode, disposing the solid electrolyte of the invention and forming a porous carbon based material as a positive electrode.

EXAMPLES

The glass ceramics and the lithium ion secondary battery and the lithium primary battery using the glass ceramics according to the invention are specifically described below with reference to the following Examples. However, it should not be construed that the invention is limited to those shown in the following Examples, and the invention can be properly modified and carried out within the scope where the gist of the invention is not Deviated.

Examples 1 to 4 and Comparative Examples 1 to 3

$H_3PO_4$, $Al(PO_3)_3$ and $Li_2CO_3$, all of which are manufactured by Nippon Chemical Industrial Co., Ltd.; $SiO_2$, manufactured by Nitchitsu Co., Ltd.; $TiO_2$, manufactured by Sakai Chemical Industry Co., Ltd.; $GeO_2$, manufactured by Sumitomo Metal Mining Co., Ltd.; and $ZrO_2$, manufactured by Nippon Denko Co., Ltd. were used as raw materials. These materials were weighed so as to have a composition as shown in Table 1 in terms of % by mass on the oxide basis, respectively and uniformly mixed; and the mixture was then charged in a platinum pot and heated for melting for 3 hours in an electric furnace at a temperature of 1,350° C. while stirring, thereby obtaining a glass melt. Thereafter, the glass melt was cast into a metallic die made of INCONEL 600 (INCONEL is a registered trademark) as heated at 300° C. through a platinum-made pipe equipped in the pot while heating. Thereafter, the glass was allowed to stand for cooling until the surface temperature thereof reached not higher than 600° C., then charged in an electric furnace heated at 550° C. and gradually cooled to room temperature, thereby preparing a glass block from which a thermal strain had been removed.

The experiment was carried out while changing the temperature of the die at the time of molding in various ways. As a result, in Examples 1 to 4, glass blocks could be obtained at a temperature between 200° C. and 400° C. In the case where the temperature of the die was not higher than 200° C., when the glass was charged in an electric furnace after molding, breakage occurred a little, whereas in the case where the temperature of the die was 400° C. or higher, the devitrification was liable to occur a little on the bottom, and there was the case where the blooming occurred. In Comparative Example 1, though the same moldability as in Examples 1 to 4 was revealed, high lithium ion conductivity was not obtained. In Comparative Example 2, when the temperature of the die was not higher than 200° C., the glass was very likely broken; and at a temperature of 350° C. or higher, the devitrification was observed on the bottom, and the moldable temperature range was narrow as compared with Examples 1 to 4. In Comparative Example 3, a glass which is free from the devitrification could not be obtained regardless of the die temperature.

The obtained glass was crushed to an extent of about 0.5 mm and measured for a glass transition point (Tx) and a crystallization starting temperature (Tg) using NETSZCH's thermal analyzer STA-409, thereby determining a value of (Tx−Tg) (° C.) exhibiting the stability of a glass. At that time, in the case where a glass could not be obtained due to the occurrence of devitrification, the measurement was not carried out.

The obtained glass block was cut and processed in a disk shape having a size of Φ25.7 mm and 1 mm in thickness, interposed by an alumina-made setter and heat treated at 890° C. for 12 hours, thereby carrying out a crystallization treatment.

The glass ceramics after the crystallization had a size of Φ25.4 mm and 1 mm in thickness. The both surfaces of this disk-shaped glass ceramics were ground and polished to obtain a glass ceramics having a size of Φ25.4 mm and 0.25 mm in thickness.

The both surfaces of the glass ceramics were subjected to sputtering with gold as a target using a quick coater, manufactured by Sanyu Electron Co., Ltd., thereby installing a gold electrode. The lithium ion conductivity at 25° C. was calculated by means of the complex impedance measurement by an alternating current two-terminal method using Solartron's impedance analyzer SI-1260. Also, a crystalline deposited on the glass ceramics was indentified using a Philips' powder X-ray diffraction measuring device. As a result, it was confirmed that all of the glass ceramics had, as a main crystalline phase, $Li_{1+x+z}M_x(Ge_{1-y}Ti_y)_{2-x}P_{3-z}Si_zO_{12}$ (wherein $0<x\leq0.6$, $0.2\leq y<0.8$, $0\leq z\leq0.5$, and M is Al and/or Ga).

The composition, the measured value of (Tx−Tg) (° C.) and the measured value of the lithium ion conductivity at 25° C. regarding each of Examples 1 to 4 and Comparative Examples 1 to 3 are shown in Table 1.

Also, a powder X-ray diffraction pattern of Example 1 is shown in FIG. 1.

TABLE 1

| Composition (% by mass) | Example 1 | Example 2 | Example 3 | Example 4 | Comparative Example 1 | Comparative Example 2 | Comparative Example 3 |
|---|---|---|---|---|---|---|---|
| $Li_2O$ | 4.2 | 4.3 | 4.3 | 4.1 | 4.2 | 4.4 | 4.2 |
| $Al_2O_3$ | 8.0 | 8.1 | 8.0 | | 7.9 | 8.0 | 8.0 |
| $Ga_2O_3$ | | | | 7.8 | | | |
| $SiO_2$ | 1.0 | 1.2 | 1.3 | 1.2 | 1.1 | 1.5 | 1.0 |
| $P_2O_5$ | 52.3 | 53.0 | 53.6 | 52.8 | 52.5 | 54.2 | 51.9 |
| $TiO_2$ | 13.2 | 16.7 | 19.8 | 15.1 | 13.6 | 23.6 | 12.3 |
| $GeO_2$ | 20.1 | 15.4 | 11.8 | 18.2 | 20.5 | 7.9 | 19.0 |
| $ZrO_2$ | 1.2 | 1.3 | 1.1 | 0.8 | 0.2 | 0.4 | 3.6 |
| | 100.0 | 100.0 | 100.0 | 100.0 | 100.0 | 100.0 | 100.0 |
| Tx − Tg (° C.) | 102.7 | 81.3 | 74.9 | 97.3 | 98.6 | 56.5 | Not measured due to devitrification |
| Ionic conductivity ($Scm^{-1}/25°$ C.) | $1.2 \times 10^{-4}$ | $1.5 \times 10^{-4}$ | $1.4 \times 10^{-4}$ | $1.0 \times 10^{-4}$ | $0.5 \times 10^{-4}$ | $0.8 \times 10^{-4}$ | |

As in the compositions of Examples 1 to 4, even when the glass ceramics of the invention does not substantially contain components which are very expensive with respect to the price of raw materials distributed in the market, such as In, Fe, Cr, Sc, Y, La, Ce, Pr, Nd, Sm, Eu, Gd, Tb, Dy, Ho, Er, Tm, Yb and Lu, it had a value of (Tx−Tg) of 70° C. or more, could be stably produced as a glass and exhibited a high value of the ionic conductivity after crystallization as $1 \times 10^{-4}$ $Scm^{-1}$ or more.

What is claimed is:

1. A battery comprising:
   a solid electrolyte comprising a lithium ion conductive glass ceramics;
   a positive electrode material and a negative electrode material on both sides of the solid electrolyte; and
   a collector,
   wherein the lithium ion conductive glass ceramics comprises from 0.5 to 2.0% of a $ZrO_2$ component, from 3.5% to 5.0% of $Li_2O$, from 50% to 55% of $P_2O_5$, from 18.2% to 30% of $GeO_2$, from 10% to 22% of $TiO_2$, and from 5% to 12% of $M_2O_3$, wherein M is one or two members selected from Al and Ga, in terms of % by mass on the oxide basis, with a mass % ratio $P_2O_5/ZrO_2$ value being 25 or more and not more than 100, and not comprising an $M'_2O_3$ component, wherein M' is one or two or more members selected from In, Fe, Cr, Sc, Y, La, Ce, Pr, Nd, Sm, Eu, Gd, Tb, Dy, Ho, Er, Tm, Yb and Lu,
   wherein, when a crystallization starting temperature of a raw glass is defined as Tx (° C.), and a glass transition point of the raw glass is defined as Tg (° C.), a value of (Tx−Tg) is 97.3° C. or more and not more than 102.7° C., and a lithium ion conductivity is $1.0 \times 10^{-4}$ $S \cdot cm^{-1}$ or more at 25° C.

2. The battery according to claim 1, wherein the lithium ion conductive glass ceramics contains a crystalline phase of $Li_{1+x+z}M_x(Ge_{1-y}Ti_y)_{2-x}P_{3-z}Si_zO_{12}$, wherein $0<x\leq0.6$, $0.2\leq y<0.8$, $0\leq z\leq0.5$, and M is one or two members selected from Al and Ga.

3. The battery according to claim 1, wherein the lithium ion conductive glass ceramics contains a component of from 0% to 2.5% of $SiO_2$ in terms of % by mass on the oxide basis.

4. A method of manufacturing a battery comprising a solid electrolyte comprising a lithium ion conductive glass ceramics, a positive electrode material and a negative electrode material on both sides of the solid electrolyte, and a collector, the method comprising:
   forming a solid electrolyte by processing a lithium ion conductive glass ceramics;
   disposing a positive electrode material and a negative electrode material on both sides of the solid electrolyte; and
   disposing a collector on the positive electrode material and the negative electrode material,
   wherein the lithium ion conductive glass ceramics comprises from 0.5 to 2.0% of a $ZrO_2$ component, from 3.5% to 5.0% of $Li_2O$, from 50% to 55% of $P_2O_5$, from 18.2% to 30% of $GeO_2$, from 10% to 22% of $TiO_2$, and from 5% to 12% of $M_2O_3$, wherein M is one or two members selected from Al and Ga, in terms of % by mass on the oxide basis, with a mass % ratio $P_2O_5/ZrO_2$ value being 25 or more and not more than 100, and not comprising an $M'_2O_3$ component, wherein M' is one or two or more members selected from In, Fe, Cr, Sc, Y, La, Ce, Pr, Nd, Sm, Eu, Gd, Tb, Dy, Ho, Er, Tm, Yb and Lu,
   wherein, when a crystallization starting temperature of a raw glass is defined as Tx (° C.), and a glass transition point of the raw glass is defined as Tg (° C.), a value of (Tx−Tg) is 97.3° C. or more and not more than 102.7° C., and a lithium ion conductivity is $1.0 \times 10^{-4}$ $S \cdot cm^{-1}$ or more at 25° C.

5. The method according to claim 4, the method further comprising processing the lithium ion conductive glass ceramics to a thickness of from 0.5 µm to 1,000 µm.

6. The method according to claim 4, wherein the processing the lithium ion conductive glass ceramics comprises:
   a step of melting a raw glass containing respective components of from 3.5% to 5.0% of $Li_2O$, from 50% to 55% of $P_2O_5$, from 18.2% to 30% of $GeO_2$, from 10% to 22% of $TiO_2$, from 0.5% to 2.0% of $ZrO_2$ and from 5% to 12% of $M_2O_3$, wherein M is one or two members selected from Al and Ga, in terms of % by mass on the oxide basis, and not containing an $M'_2O_3$ component, wherein M' is one or two or more members selected from In, Fe, Cr, Sc, Y, La, Ce, Pr, Nd, Sm, Eu, Gd, Tb, Dy, Ho, Er, Tm, Yb and Lu;
   a step of molding the molten raw glass; and
   a crystallization step of heat treating the molded raw glass to deposit a crystalline phase of $Li_{1+x+z}M_x(Ge_{1-y}Ti_y)_{2-x}P_{3-z}Si_zO_{12}$, wherein $0<x\leq0.6$, $0.2\leq y<0.8$, $0\leq z\leq0.5$, and M is one or two members selected from Al and Ga.

7. The method according to claim 6, wherein the raw glass contains a component of from 0% to 2.5% of $SiO_2$ in terms of % by mass on the oxide basis.

8. The method according to claim 6, further comprising:
   a step of grinding the lithium ion conductive glass ceramics and a step of polishing it.

9. The battery according to claim 1, wherein the mass % ratio $P_2O_5/ZrO_2$ value of the lithium ion conductive glass ceramics is 35 or more and not more than 75.

\* \* \* \* \*